United States Patent
Jung et al.

(10) Patent No.: US 10,365,458 B2
(45) Date of Patent: Jul. 30, 2019

(54) OPTICAL IMAGING SYSTEM

(71) Applicant: SAMSUNG ELECTRO-MECHANICS CO., LTD., Suwon-si (KR)

(72) Inventors: Jin Hwa Jung, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 57 days.

(21) Appl. No.: 15/593,391

(22) Filed: May 12, 2017

(65) Prior Publication Data
US 2018/0180856 A1    Jun. 28, 2018

(30) Foreign Application Priority Data
Dec. 28, 2016  (KR) ................ 10-2016-0181232

(51) Int. Cl.
*G02B 5/20* (2006.01)
*G02B 13/00* (2006.01)

(52) U.S. Cl.
CPC .......... *G02B 13/0045* (2013.01); *G02B 5/208* (2013.01)

(58) Field of Classification Search
CPC ................................. G02B 13/0045
USPC ...................................... 359/708
See application file for complete search history.

(56) References Cited

U.S. PATENT DOCUMENTS

| | | | |
|---|---|---|---|
| 2012/0069456 A1 | 3/2012 | Suzuki | |
| 2013/0088787 A1* | 4/2013 | Peng | G02B 15/173 359/687 |
| 2014/0268367 A1 | 9/2014 | Kawamura | |
| 2015/0103414 A1* | 4/2015 | Baik | G02B 9/64 359/708 |
| 2015/0124333 A1* | 5/2015 | Noda | G02B 13/0045 359/713 |
| 2015/0131172 A1* | 5/2015 | Park | G02B 9/62 359/759 |
| 2015/0177490 A1* | 6/2015 | Cho | G02B 13/0045 348/335 |
| 2016/0187622 A1* | 6/2016 | Huang | G02B 13/0045 348/335 |

FOREIGN PATENT DOCUMENTS

| | | |
|---|---|---|
| JP | 2012-63676 A | 3/2012 |
| JP | 2014-178522 A | 9/2014 |
| JP | 5963040 B2 | 8/2016 |

\* cited by examiner

*Primary Examiner* — James R Greece
(74) *Attorney, Agent, or Firm* — NSIP Law

(57) ABSTRACT

An optical imaging system includes a first lens, a second lens, a third lens, a fourth lens, a fifth lens, a sixth lens, a seventh lens, and an eighth lens, sequentially disposed from an object side to an imaging plane. The optical imaging system satisfies the expression BFL/f<0.15, where BFL represents a distance from an image-side surface of the eighth lens to an imaging plane of an image sensor and f represents an overall focal length of the optical imaging system.

20 Claims, 24 Drawing Sheets

| SURFACE NO. | | RADIUS OF CURVATURE | THICKNESS OR DISTANCE | FOCAL LENGTH | REFRACTIVE INDEX | ABBE NUMBER |
|---|---|---|---|---|---|---|
| Object | | | | | | |
| 1 | L1 | 2.474 | 0.801 | 4.622 | 1.535 | 56 |
| 2 | | 584.331 | 0.252 | | | |
| 3 | L2 | 7.731 | 0.254 | -7.990 | 1.661 | 20.4 |
| 4 | | 3.116 | 0.502 | | | |
| 5 | L3 | 5.200 | 0.373 | 22.288 | 1.5441 | 56 |
| 6(stop) | | 8.844 | 0.431 | | | |
| 7 | L4 | 12.071 | 0.311 | 38.607 | 1.634 | 23.9 |
| 8 | | 23.335 | 0.661 | | | |
| 9 | L5 | -30.717 | 0.258 | -11.193 | 1.5441 | 56 |
| 10 | | 7.663 | 0.681 | | | |
| 11 | L6 | -3.558 | 0.561 | 106.931 | 1.5441 | 56 |
| 12 | | -3.540 | 0.789 | | | |
| 13 | L7 | -7.897 | 0.405 | -7.066 | 1.5441 | 56 |
| 14 | | 7.696 | 0.332 | | | |
| 15 | L8 | 24.055 | 0.638 | 18.325 | 1.651 | 21.5 |
| 16 | | -23.879 | 0.100 | | | |
| 17 | IR Filter | Infinity | 0.210 | | 1.519 | 64.2 |
| 18 | | Infinity | 0.926 | | | |
| Image | | Infinity | 0.000 | | | |

FIG. 3

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| K | -0.11925 | 99.00000 | 16.35733 | 2.48143 | 9.63554 | -4.09136 | 24.90900 | 0.00000 | 2.38231 | 18.29998 | -0.11403 | 0.26325 | 3.72736 | -55.51006 | -54.33765 | 0.00016 |
| A | -0.00057 | -0.00915 | -0.05462 | -0.05841 | -0.00483 | 0.00897 | -0.01575 | -0.03041 | -0.07711 | -0.04482 | 0.00559 | 0.00975 | -0.01801 | -0.04677 | -0.09034 | -0.07336 |
| B | -0.00108 | 0.02349 | 0.10253 | 0.10561 | 0.01512 | -0.00771 | -0.02919 | -0.02049 | 0.01135 | 0.02031 | -0.02890 | -0.02963 | -0.03856 | 0.01603 | 0.08271 | 0.05162 |
| C | 0.00140 | -0.01835 | -0.08824 | -0.08835 | 0.01920 | 0.02946 | 0.02071 | 0.01516 | 0.06195 | 0.04370 | 0.03181 | 0.02652 | 0.03723 | -0.00723 | -0.04781 | -0.02260 |
| D | -0.00123 | 0.00912 | 0.04926 | 0.05156 | -0.04739 | -0.04046 | -0.01406 | -0.00504 | -0.06874 | -0.04166 | -0.01636 | -0.01252 | -0.01571 | 0.00253 | 0.01677 | 0.00596 |
| E | 0.00060 | -0.00312 | -0.01848 | -0.02134 | 0.05811 | 0.03581 | 0.00663 | 0.00066 | 0.03503 | 0.01450 | 0.00471 | 0.00347 | 0.00386 | -0.00058 | -0.00389 | -0.00102 |
| F | -0.00018 | 0.00074 | 0.00440 | 0.00581 | -0.04449 | -0.01978 | -0.00144 | 0.00008 | -0.01072 | -0.00208 | -0.00078 | -0.00057 | -0.00057 | 0.00008 | 0.00061 | 0.00011 |
| G | 0.00003 | -0.00012 | -0.00056 | -0.00083 | 0.02135 | 0.00680 | 0.00000 | 0.00000 | 0.00187 | 0.00002 | 0.00007 | 0.00005 | 0.00005 | 0.00000 | -0.00006 | -0.00001 |
| H | 0.00000 | 0.00001 | 0.00002 | 0.00004 | -0.00583 | -0.00134 | 0.00000 | 0.00000 | -0.00014 | 0.00002 | 0.00000 | 0.00000 | 0.00000 | 0.00000 | 0.00000 | 0.00000 |
| J | 0.00000 | 0.00000 | 0.00000 | 0.00000 | 0.00069 | 0.00011 | 0.00000 | 0.00000 | 0.00000 | 0.00000 | 0.00000 | 0.00000 | 0.00000 | 0.00000 | 0.00000 | 0.00000 |

FIG. 4

| SURFACE NO. | | RADIUS OF CURVATURE | THICKNESS OR DISTANCE | FOCAL LENGTH | REFRACTIVE INDEX | ABBE NUMBER |
|---|---|---|---|---|---|---|
| Object | | | | | | |
| 1 | L1 | 2.474 | 0.800 | 4.6171 | 1.535 | 56 |
| 2 | | 764.946 | 0.233 | | | |
| 3 | L2 | 7.723 | 0.243 | -7.8634 | 1.661 | 20.4 |
| 4 | | 3.088 | 0.530 | | | |
| 5 | L3 | 5.121 | 0.347 | 21.3041 | 1.5441 | 56 |
| 6(stop) | | 8.922 | 0.450 | | | |
| 7 | L4 | 12.808 | 0.282 | 31.1721 | 1.634 | 23.9 |
| 8 | | 35.382 | 0.794 | | | |
| 9 | L5 | -23.048 | 0.200 | -10.1467 | 1.5441 | 56 |
| 10 | | 7.327 | 0.837 | | | |
| 11 | L6 | -6.359 | 0.240 | -53.5815 | 1.5441 | 56 |
| 12 | | -8.231 | 1.000 | | | |
| 13 | L7 | -8.054 | 0.300 | -7.0016 | 1.5441 | 56 |
| 14 | | 7.388 | 0.357 | | | |
| 15 | L8 | 20.993 | 0.587 | 18.1526 | 1.651 | 21.5 |
| 16 | | -27.361 | 0.100 | | | |
| 17 | IR Filter | Infinity | 0.210 | | 1.519 | 64.2 |
| 18 | | Infinity | 0.590 | | | |
| Image | | Infinity | 0.000 | | | |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| K | -0.1206 | 99.0000 | 16.2975 | 2.4926 | 9.6597 | -4.0914 | 24.9090 | 0.0000 | 2.3823 | 17.7340 | 0.3285 | 1.5927 | 3.7983 | -55.5101 | 543.3377 | 0.0002 |
| A | -0.0004 | -0.0399 | -0.0579 | -0.0592 | -0.0021 | 0.0107 | -0.0133 | -0.0261 | -0.0755 | -0.0445 | 0.0134 | 0.0169 | -0.0047 | -0.0153 | -0.0984 | -0.1233 |
| B | -0.0010 | 0.0266 | 0.1103 | 0.1088 | 0.0116 | -0.0144 | -0.0381 | -0.0291 | 0.0003 | 0.0115 | -0.0623 | -0.0584 | -0.0516 | -0.0102 | 0.1104 | 0.1040 |
| C | 0.0014 | -0.0219 | -0.0982 | -0.0939 | 0.0162 | 0.0353 | 0.0280 | 0.0214 | 0.0936 | 0.0747 | 0.0660 | 0.0541 | 0.0422 | 0.0023 | -0.0740 | -0.0537 |
| D | -0.0013 | 0.0115 | 0.0575 | 0.0574 | -0.0350 | -0.0436 | -0.0169 | -0.0072 | -0.1046 | -0.0751 | -0.0321 | -0.0246 | -0.0160 | 0.0016 | 0.0293 | 0.0170 |
| E | 0.0006 | -0.0041 | -0.0227 | -0.0248 | 0.0418 | 0.0368 | 0.0075 | 0.0009 | 0.0540 | 0.0314 | 0.0085 | 0.0062 | 0.0035 | -0.0009 | -0.0073 | -0.0034 |
| F | -0.0002 | 0.0010 | 0.0057 | 0.0069 | -0.0328 | -0.0197 | -0.0016 | 0.0001 | -0.0160 | -0.0065 | -0.0013 | -0.0009 | -0.0005 | 0.0002 | 0.0012 | 0.0004 |
| G | 0.0000 | -0.0002 | -0.0008 | -0.0011 | 0.0167 | 0.0067 | 0.0000 | 0.0000 | 0.0026 | 0.0006 | 0.0001 | 0.0001 | 0.0000 | 0.0000 | -0.0001 | 0.0000 |
| H | 0.0000 | 0.0000 | 0.0000 | 0.0000 | -0.0049 | -0.0013 | 0.0000 | 0.0000 | -0.0002 | 0.0000 | 0.0000 | 0.0000 | 0.0000 | 0.0000 | 0.0000 | 0.0000 |
| J | 0.0000 | 0.0000 | 0.0000 | 0.0000 | 0.0006 | 0.0001 | 0.0000 | 0.0000 | 0.0000 | 0.0000 | 0.0000 | 0.0000 | 0.0000 | 0.0000 | 0.0000 | 0.0000 |

| SURFACE NO. | | RADIUS OF CURVATURE | THICKNESS OR DISTANCE | FOCAL LENGTH | REFRACTIVE INDEX | ABBE NUMBER |
|---|---|---|---|---|---|---|
| Object | | | | | | |
| 1 | L1 | 2.426 | 0.800 | 4.5688 | 1.535 | 56 |
| 2 | | 179.660 | 0.221 | | | |
| 3 | L2 | 7.394 | 0.240 | -7.6670 | 1.661 | 20.4 |
| 4 | | 2.987 | 0.388 | | | |
| 5 | L3 | 5.048 | 0.380 | 15.6031 | 1.5441 | 56 |
| 6(stop) | | 12.039 | 0.450 | | | |
| 7 | L4 | 12.011 | 0.240 | 35.7796 | 1.634 | 23.9 |
| 8 | | 25.026 | 0.965 | | | |
| 9 | L5 | -12.359 | 0.250 | -7.4186 | 1.5441 | 56 |
| 10 | | 6.079 | 1.090 | | | |
| 11 | L6 | -4.263 | 0.561 | -45.0951 | 1.5441 | 56 |
| 12 | | -5.395 | 0.249 | | | |
| 13 | L7 | -11.188 | 0.350 | -8.6419 | 1.5441 | 56 |
| 14 | | 8.266 | 0.357 | | | |
| 15 | L8 | 20.512 | 0.560 | 25.7824 | 1.651 | 21.5 |
| 16 | | -96.540 | 0.100 | | | |
| 17 | IR Filter | Infinity | 0.210 | | 1.519 | 64.2 |
| 18 | | Infinity | 0.590 | | | |
| Image | | Infinity | 0.000 | | | |

FIG. 11

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| K | -0.1403 | 99.0060 | 15.9472 | 2.5652 | 9.6008 | -4.0914 | 24.9090 | 0.0000 | 2.3823 | 12.3281 | -1.9374 | -1.1491 | 2.0260 | -55.5101 | 54.3377 | 0.0002 |
| A | -0.0013 | -0.0132 | -0.0597 | -0.0596 | 0.0029 | 0.0206 | -0.0177 | -0.0371 | -0.1117 | -0.0791 | 0.0107 | 0.0594 | 0.0280 | -0.0559 | -0.1711 | -0.1965 |
| B | -0.0009 | 0.0294 | 0.1079 | 0.1001 | -0.0030 | -0.0257 | -0.0254 | -0.0082 | 0.0845 | 0.1016 | -0.0444 | -0.1082 | -0.1173 | 0.0467 | 0.2386 | 0.2174 |
| C | 0.0012 | -0.0234 | -0.0913 | -0.0772 | 0.0366 | 0.0465 | 0.0197 | 0.0033 | 0.0095 | -0.0247 | 0.0502 | 0.0804 | 0.0934 | -0.0394 | -0.1701 | -0.1292 |
| D | -0.0013 | 0.0122 | 0.0519 | 0.0439 | -0.0552 | -0.0550 | -0.0183 | -0.0007 | -0.0652 | -0.0078 | -0.0266 | -0.0319 | -0.0373 | 0.0204 | 0.0680 | 0.0437 |
| E | 0.0007 | -0.0043 | -0.0205 | -0.0186 | 0.0576 | 0.0437 | 0.0103 | 0.0001 | 0.0481 | 0.0005 | 0.0085 | 0.0076 | 0.0088 | -0.0063 | -0.0166 | -0.0090 |
| F | -0.0002 | 0.0010 | 0.0053 | 0.0052 | -0.0425 | -0.0221 | -0.0023 | 0.0001 | -0.0191 | 0.0025 | -0.0017 | -0.0011 | -0.0012 | 0.0012 | 0.0025 | 0.0012 |
| G | 0.0000 | -0.0001 | -0.0007 | -0.0008 | 0.0210 | 0.0073 | 0.0000 | 0.0000 | 0.0042 | -0.0009 | 0.0002 | 0.0001 | 0.0001 | -0.0001 | -0.0002 | -0.0001 |
| H | 0.0000 | 0.0000 | 0.0000 | 0.0000 | -0.0060 | -0.0015 | 0.0000 | 0.0000 | -0.0004 | 0.0001 | 0.0000 | 0.0000 | 0.0000 | 0.0000 | 0.0000 | 0.0000 |
| J | 0.0000 | 0.0000 | 0.0000 | 0.0000 | 0.0007 | 0.0001 | 0.0000 | 0.0000 | 0.0000 | 0.0000 | 0.0000 | 0.0000 | 0.0000 | 0.0000 | 0.0000 | 0.0000 |

FIG. 12

| SURFACE NO. | | RADIUS OF CURVATURE | THICKNESS OR DISTANCE | FOCAL LENGTH | REFRACTIVE INDEX | ABBE NUMBER |
|---|---|---|---|---|---|---|
| Object | | | | | | |
| 1 | L1 | 2.445 | 0.798 | 4.5911 | 1.535 | 56 |
| 2 | | 246.784 | 0.261 | | | |
| 3 | L2 | 7.450 | 0.240 | -7.4330 | 1.661 | 20.4 |
| 4 | | 2.941 | 0.462 | | | |
| 5 | L3 | 4.869 | 0.386 | 15.5555 | 1.5441 | 56 |
| 6 | | 11.075 | 0.408 | | | |
| 7 | L4 | 14.185 | 0.240 | 27.9197 | 1.634 | 23.9 |
| 8(stop) | | 68.006 | 0.883 | | | |
| 9 | L5 | -15.073 | 0.250 | -8.6340 | 1.5441 | 56 |
| 10 | | 6.911 | 0.817 | | | |
| 11 | L6 | -10.145 | 0.240 | -14.9025 | 1.5441 | 56 |
| 12 | | 41.695 | 0.885 | | | |
| 13 | L7 | -8.774 | 0.300 | -7.3676 | 1.5441 | 56 |
| 14 | | 7.534 | 0.220 | | | |
| 15 | L8 | 21.406 | 0.610 | 12.3205 | 1.651 | 21.5 |
| 16 | | -12.882 | 0.100 | | | |
| 17 | IR Filter | Infinity | 0.210 | | 1.519 | 64.2 |
| 18 | | Infinity | 0.590 | | | |
| Image | | Infinity | 0.000 | | | |

FIG. 15

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| K | -0.1352 | 99.0000 | 16.2101 | 2.5222 | 9.6199 | -4.0914 | 24.9090 | 0.0000 | 2.3823 | 17.3348 | -0.0370 | 0.2657 | 4.0057 | -55.5101 | 54.3377 | 0.0002 |
| A | -0.0011 | -0.0105 | -0.0572 | -0.0568 | 0.0029 | 0.0165 | -0.0135 | -0.0323 | -0.0983 | -0.0597 | 0.0153 | 0.0202 | -0.0400 | -0.1187 | -0.1976 | -0.1817 |
| B | -0.0014 | 0.0210 | 0.0996 | 0.0970 | 0.0016 | -0.0221 | -0.0319 | -0.0187 | 0.0352 | 0.0477 | -0.0526 | -0.0499 | -0.0186 | 0.1342 | 0.2795 | 0.1957 |
| C | 0.0017 | -0.0118 | -0.0760 | -0.0695 | 0.0213 | 0.0338 | 0.0170 | 0.0122 | 0.0804 | 0.0554 | 0.0539 | 0.0431 | 0.0282 | -0.1145 | -0.2155 | -0.1178 |
| D | -0.0014 | 0.0032 | 0.0365 | 0.0321 | -0.0339 | -0.0361 | -0.0065 | -0.0036 | -0.1188 | -0.0745 | -0.0241 | -0.0186 | -0.0135 | 0.0586 | 0.0955 | 0.0415 |
| E | 0.0007 | 0.0000 | -0.0121 | -0.0102 | 0.0387 | 0.0331 | 0.0024 | 0.0004 | 0.0694 | 0.0343 | 0.0052 | 0.0045 | 0.0037 | -0.0182 | -0.0259 | -0.0090 |
| F | -0.0002 | -0.0003 | 0.0027 | 0.0022 | -0.0293 | -0.0195 | -0.0007 | 0.0001 | -0.0222 | -0.0076 | -0.0005 | -0.0006 | -0.0006 | 0.0035 | 0.0044 | 0.0012 |
| G | 0.0000 | 0.0001 | -0.0003 | -0.0003 | 0.0142 | 0.0069 | 0.0000 | 0.0000 | 0.0038 | 0.0008 | 0.0000 | 0.0001 | 0.0001 | -0.0004 | -0.0005 | -0.0001 |
| H | 0.0000 | 0.0000 | 0.0000 | 0.0000 | -0.0040 | -0.0014 | 0.0000 | 0.0000 | -0.0003 | 0.0000 | 0.0000 | 0.0000 | 0.0000 | 0.0000 | 0.0000 | 0.0000 |
| J | 0.0000 | 0.0000 | 0.0000 | 0.0000 | 0.0005 | 0.0001 | 0.0000 | 0.0000 | 0.0000 | 0.0000 | 0.0000 | 0.0000 | 0.0000 | 0.0000 | 0.0000 | 0.0000 |

FIG. 16

| SURFACE NO. | | RADIUS OF CURVATURE | THICKNESS OR DISTANCE | FOCAL LENGTH | REFRACTIVE INDEX | ABBE NUMBER |
|---|---|---|---|---|---|---|
| Object | | | | | | |
| 1 | L1 | 2.491 | 0.803 | 4.5945 | 1.535 | 56 |
| 2 | | -247.993 | 0.133 | | | |
| 3 | L2 | 8.203 | 0.240 | -10.0201 | 1.661 | 20.4 |
| 4 | | 3.643 | 0.553 | | | |
| 5 | L3 | 6.516 | 0.370 | -615.7002 | 1.5441 | 56 |
| 6(Stop) | | 6.264 | 0.429 | | | |
| 7 | L4 | 8.727 | 0.542 | 1017.3800 | 1.634 | 23.9 |
| 8 | | 8.631 | 0.696 | | | |
| 9 | L5 | 19.490 | 0.251 | -24.5080 | 1.5441 | 56 |
| 10 | | 7.903 | 0.614 | | | |
| 11 | L6 | -6.356 | 0.325 | 86.4093 | 1.5441 | 56 |
| 12 | | -5.704 | 1.010 | | | |
| 13 | L7 | -7.592 | 0.301 | -6.5688 | 1.5441 | 56 |
| 14 | | 6.908 | 0.332 | | | |
| 15 | L8 | 24.614 | 0.550 | 15.8206 | 1.651 | 21.5 |
| 16 | | -17.851 | 0.100 | | | |
| 17 | IR Filter | Infinity | 0.210 | | 1.519 | 64.2 |
| 18 | | Infinity | 1.035 | | | |
| Image | | Infinity | 0.000 | | | |

FIG. 19

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| K | -0.1186 | 99.0000 | 16.0918 | 2.5506 | 9.8768 | -4.2143 | 24.5298 | 0.0000 | 2.3823 | 17.5315 | -0.4458 | 1.3586 | 2.7938 | -55.5101 | 54.3377 | 0.0002 |
| A | 0.0001 | -0.0143 | -0.0493 | -0.0426 | -0.0005 | 0.0067 | -0.0226 | -0.0285 | -0.0636 | -0.0406 | 0.0155 | 0.0242 | -0.0095 | -0.0231 | -0.0686 | -0.0584 |
| B | -0.0012 | 0.0366 | 0.0870 | 0.0682 | 0.0074 | -0.0120 | -0.0196 | -0.0114 | -0.0091 | -0.0064 | -0.0677 | -0.0618 | -0.0472 | -0.0145 | 0.0620 | 0.0398 |
| C | 0.0012 | -0.0345 | -0.0726 | -0.0482 | 0.0210 | 0.0359 | 0.0109 | 0.0067 | 0.0817 | 0.0779 | 0.0752 | 0.0572 | 0.0426 | 0.0118 | -0.0412 | -0.0191 |
| D | -0.0011 | 0.0210 | 0.0399 | 0.0238 | -0.0360 | -0.0429 | -0.0070 | -0.0024 | -0.0806 | -0.0638 | -0.0416 | -0.0290 | -0.0177 | -0.0043 | 0.0170 | 0.0056 |
| E | 0.0006 | -0.0088 | -0.0145 | -0.0077 | 0.0410 | 0.0348 | 0.0025 | 0.0004 | 0.0383 | 0.0233 | 0.0133 | 0.0087 | 0.0042 | 0.0010 | -0.0046 | -0.0011 |
| F | -0.0002 | 0.0025 | 0.0033 | 0.0015 | -0.0322 | -0.0183 | -0.0004 | 0.0001 | -0.0105 | -0.0043 | -0.0025 | -0.0016 | -0.0006 | -0.0002 | 0.0008 | 0.0001 |
| G | 0.0000 | -0.0005 | -0.0004 | -0.0001 | 0.0164 | 0.0061 | 0.0000 | 0.0000 | 0.0016 | 0.0003 | 0.0002 | 0.0002 | 0.0001 | 0.0000 | -0.0001 | 0.0000 |
| H | 0.0000 | 0.0001 | 0.0000 | 0.0000 | -0.0048 | -0.0012 | 0.0000 | 0.0000 | -0.0001 | 0.0000 | 0.0000 | 0.0000 | 0.0000 | 0.0000 | 0.0000 | 0.0000 |
| J | 0.0000 | 0.0000 | 0.0000 | 0.0000 | 0.0006 | 0.0001 | 0.0000 | 0.0000 | 0.0000 | 0.0000 | 0.0000 | 0.0000 | 0.0000 | 0.0000 | 0.0000 | 0.0000 |

FIG. 20

| SURFACE NO. | | RADIUS OF CURVATURE | THICKNESS OR DISTANCE | FOCAL LENGTH | REFRACTIVE INDEX | ABBE NUMBER |
|---|---|---|---|---|---|---|
| Object | | | | | | |
| 1 | L1 | 2.315 | 0.837 | 4.4844 | 1.535 | 56 |
| 2 | | 51.536 | 0.134 | | | |
| 3 | L2 | 6.915 | 0.250 | -7.3212 | 1.661 | 20.4 |
| 4 | | 2.824 | 0.229 | | | |
| 5 | L3 | 4.771 | 0.498 | 12.1061 | 1.5441 | 56 |
| 6 | | 16.465 | 0.307 | | | |
| 7 | L4 | 9.197 | 0.302 | 29.3566 | 1.634 | 23.9 |
| 8(stop) | | 17.761 | 0.936 | | | |
| 9 | L5 | -7.478 | 0.250 | -5.8446 | 1.5441 | 56 |
| 10 | | 5.644 | 0.686 | | | |
| 11 | L6 | -6.008 | 0.300 | -243.2353 | 1.651 | 21.5 |
| 12 | | -6.366 | 0.585 | | | |
| 13 | L7 | -10.997 | 0.250 | -8.4043 | 1.5441 | 56 |
| 14 | | 7.953 | 0.458 | | | |
| 15 | L8 | 27.721 | 0.578 | 120.4209 | 1.651 | 21.5 |
| 16 | | 42.305 | 0.100 | | | |
| 17 | IR Filter | Infinity | 0.210 | | 1.519 | 64.2 |
| 18 | | Infinity | 0.590 | | | |
| Image | | Infinity | 0.000 | | | |

FIG. 23

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| K | -0.2249 | 99.0000 | 15.2220 | 2.5963 | 9.6393 | -4.0914 | 24.9090 | 0.0000 | 2.3823 | 9.8501 | 2.0351 | 0.2657 | 1.6240 | -55.5101 | 51.4088 | 0.0302 |
| A | -0.0019 | -0.0295 | -0.0822 | -0.0778 | -0.0010 | 0.0294 | -0.0174 | -0.0451 | -0.1043 | -0.0368 | 0.0728 | 0.0666 | -0.0371 | -0.1093 | -0.2574 | -0.2945 |
| B | -0.0002 | 0.0765 | 0.1646 | 0.1301 | 0.0043 | -0.0357 | -0.0336 | -0.0150 | -0.0028 | 0.0088 | -0.0970 | -0.0967 | -0.1426 | 0.0517 | 0.3760 | 0.3277 |
| C | 0.0005 | -0.0928 | -0.1813 | -0.1235 | 0.0311 | 0.0500 | 0.0221 | 0.0129 | 0.1499 | 0.1039 | 0.0731 | 0.0735 | 0.1898 | -0.0428 | -0.2986 | -0.1994 |
| D | -0.0019 | 0.0741 | 0.1418 | 0.1052 | -0.0373 | -0.0583 | -0.0146 | -0.0046 | -0.2198 | -0.1209 | -0.0258 | -0.0273 | -0.1077 | 0.0356 | 0.1343 | 0.0694 |
| E | 0.0015 | -0.0383 | -0.0730 | -0.0618 | 0.0275 | 0.0444 | 0.0082 | 0.0007 | 0.1556 | 0.0594 | 0.0033 | 0.0049 | 0.0353 | -0.0168 | -0.0361 | -0.0144 |
| F | -0.0006 | 0.0126 | 0.0226 | 0.0209 | -0.0144 | -0.0206 | -0.0019 | 0.0001 | -0.0685 | -0.0147 | 0.0003 | -0.0003 | -0.0071 | 0.0044 | 0.0059 | 0.0018 |
| G | 0.0001 | -0.0026 | -0.0037 | -0.0036 | 0.0049 | 0.0064 | 0.0000 | 0.0000 | 0.0174 | 0.0017 | -0.0001 | 0.0000 | 0.0009 | -0.0007 | -0.0006 | -0.0001 |
| H | 0.0000 | 0.0003 | 0.0002 | 0.0002 | -0.0007 | -0.0013 | 0.0000 | 0.0000 | -0.0018 | -0.0001 | 0.0000 | 0.0000 | -0.0001 | 0.0001 | 0.0000 | 0.0000 |
| J | 0.0000 | 0.0000 | 0.0000 | 0.0000 | 0.0000 | 0.0001 | 0.0000 | 0.0000 | 0.0000 | 0.0000 | 0.0000 | 0.0000 | 0.0000 | 0.0000 | 0.0000 | 0.0000 |

FIG. 24

OPTICAL IMAGING SYSTEM

CROSS-REFERENCE TO RELATED APPLICATION(S)

This application claims benefit of priority under 35 U.S.C. § 119(a) to Korean Patent Application No. 10-2016-0181232 filed on Dec. 28, 2016 in the Korean Intellectual Property Office, the disclosure of which is incorporated herein by reference in its entirety for all purposes.

BACKGROUND

1. Field

The present disclosure relates to an optical imaging system.

2. Description of Related Art

Recently, mobile communications terminals have been provided with camera modules, enabling image capturing and video calling. In addition, as levels of functionality of camera modules in mobile communications terminals have gradually increased, those camera modules have gradually been implemented with higher levels of resolution and performance.

However, because there is a trend for mobile communications terminals to be miniaturized and lightened, there are limitations in realizing camera modules having high levels of resolution and performance. In order to provide miniaturized, light modules, recently camera module lenses have been formed of plastic, a material lighter than glass. Optical imaging systems also have been configured with five or more lenses in order to implement a high level of resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, an optical imaging system includes a first lens, a second lens, a third lens, a fourth lens, a fifth lens, a sixth lens, a seventh lens, and an eighth lens sequentially disposed from an object side to an imaging plane, wherein BFL/f<0.15, where BFL represents a distance from an image-side surface of the eighth lens to an imaging plane of an image sensor and f represents an overall focal length of the optical imaging system.

The optical imaging system may satisfy the expression $0.7<TTL/f<1.0$, where TTL represents a distance from an object-side surface of the first lens to the imaging plane of the image sensor. The optical imaging system can satisfy the expression $f/ImgH<2.9$, where ImgH represents a half of a diagonal length of the imaging plane of the image sensor. The optical imaging system may satisfy the expression $-30<f6/f<30$, where f6 represents a focal length of the sixth lens. The optical imaging system can satisfy the expression $TTL/ImgH>1.0$.

The optical imaging system may further include a stop disposed between the third lens and the fourth lens or between the fourth lens and the fifth lens. The object-side surfaces and image-side surfaces of the first to eighth lenses of the optical imaging system can be aspherical.

The optical imaging system may be configured with a first lens having a positive refractive power and a convex object-side surface along an optical axis. The optical imaging system can be configured with a second lens having a negative refractive power, a convex object-side surface along an optical axis, and a concave image-side surface along the optical axis. The optical imaging system may be configured with a third lens having a positive or negative refractive power, a convex object-side surface along an optical axis, and a concave image-side surface along the optical axis. The optical imaging system can be configured with a fourth lens having a positive refractive power, a convex object-side surface along an optical axis, and a concave image-side surface along the optical axis.

The optical imaging system may be configured with a fifth lens having a negative refractive power and a concave image-side surface along an optical axis. The optical imaging system can be configured with a sixth lens having a positive or negative refractive power and a concave object-side surface along an optical axis. The optical imaging system may be configured with a seventh lens having a negative refractive power, a concave object-side surface along an optical axis, and a concave image-side surface along the optical axis. The optical imaging system can be configured with an eighth lens having a positive refractive power and a convex object-side surface along an optical axis.

In another general aspect, an optical imaging system includes a first lens, a second lens, a third lens, a fourth lens, a fifth lens, a sixth lens, a seventh lens, and an eighth lens, sequentially disposed from an object side to an imaging plane. The first to eighth lenses are disposed to be spaced apart from each other by a distance along an optical axis. The expression $0.7<TTL/f<1.0$ is satisfied, where TTL represents a distance from an object-side surface of the first lens to an imaging plane of an image sensor and f represents an overall focal length of the optical imaging system.

In another general aspect, an optical imaging system includes a first lens having a positive refractive power, a second lens, a third lens, a fourth lens, a fifth lens, a sixth lens, a seventh lens, and an eighth lens having a convex object-side surface along an optical axis. The first to eighth lenses are sequentially disposed from an object side to an imaging plane. An F-number of the optical imaging system is 2.4 or less. A field of view (FOV) for the optical imaging system is 40° or less. The expression $0.7<TTL/f<1.0$ is satisfied in the optical imaging system, where TTL represents a distance from an object-side surface of the first lens to an imaging plane of an image sensor and f represents an overall focal length of the optical imaging system.

BRIEF DESCRIPTION OF DRAWINGS

The above and other aspects, features, and advantages of the present disclosure will be more clearly understood from the following detailed description taken in conjunction with the accompanying drawings, in which:

FIG. 3 is a table listing respective characteristics of lenses of the optical imaging system illustrated in FIG. 1;

FIG. 4 is a table listing respective aspherical coefficients of lenses of the optical imaging system illustrated in FIG. 1;

FIG. 7 is a table listing respective characteristics of lenses of the optical imaging system illustrated in FIG. 5;

FIG. 8 is a table listing respective aspherical coefficients of lenses illustrated in FIG. 5;

FIG. 11 is a table listing respective characteristics of lenses of the optical imaging system illustrated in FIG. 9;

FIG. 12 is a table listing respective aspherical coefficients of lenses of the optical imaging system illustrated in FIG. 9;

FIG. 15 is a table listing respective characteristics of lenses of the optical imaging system illustrated in FIG. 13;

FIG. 16 is a table listing respective aspherical coefficients of lenses illustrated in FIG. 13;

FIG. 19 is a table listing respective characteristics of lenses of the optical imaging system illustrated in FIG. 17;

FIG. 20 is a table listing respective aspherical coefficients of lenses illustrated in FIG. 17;

FIG. 23 is a table listing respective characteristics of lenses of the optical imaging system illustrated in FIG. 21; and FIG. 24 is a table listing respective aspherical coefficients of lenses of the optical imaging system illustrated in FIG. 21.

Figure 1:
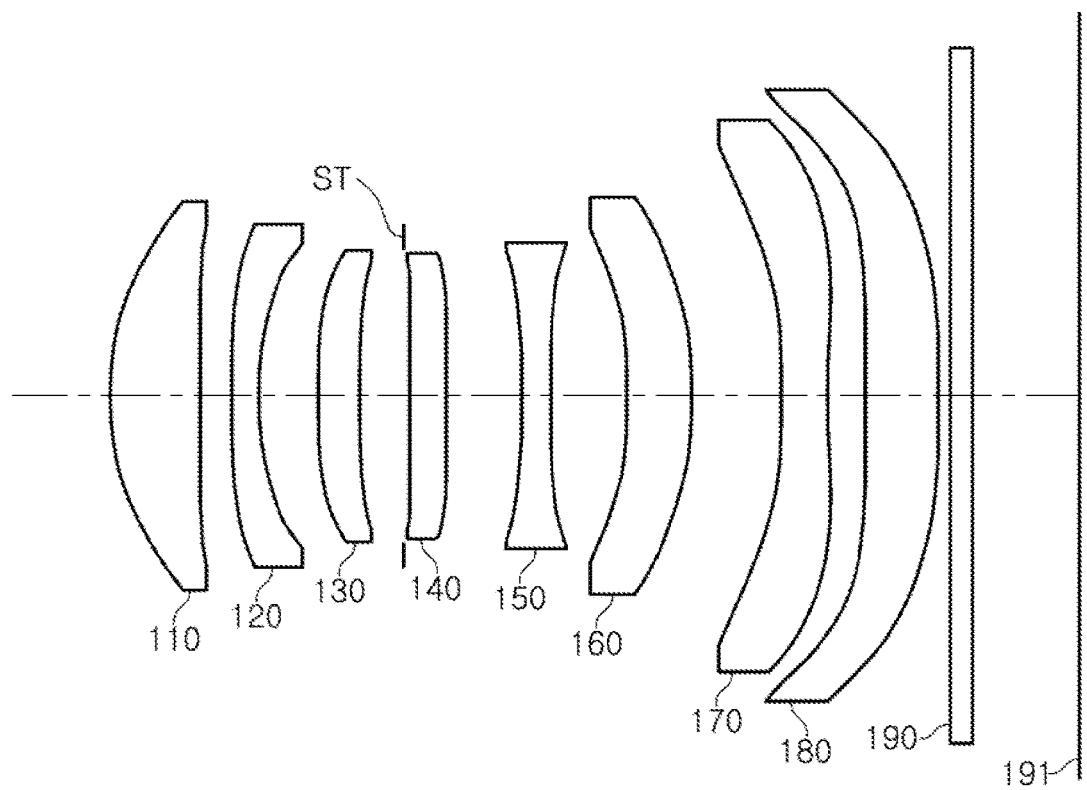
FIG. 1 is a view illustrating an optical imaging system according to a first example.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed, as will be apparent after an understanding of the disclosure, with the exception of operations necessarily occurring in a certain order. Also, descriptions of functions and constructions that are well known may be omitted for increased clarity and conciseness.

The features described herein may be embodied in different forms, and should not be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Hereinafter, embodiments of the present disclosure will now be described in detail with reference to the accompanying drawings. Examples of the present disclosure provide an optical imaging system having a narrow field of view while retaining a thin width. Examples of the present disclosure also provide an optical imaging system in which an aberration correction is improved and a high level of resolution is implemented.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

Although terms such as "first," "second," and "third" may be used herein to describe various components, regions, or sections, these components, regions, or sections are not to be limited by these terms, unless otherwise specifically noted such as in the below instances. Rather, these terms are only used to distinguish one component, region, or section from another component, region, or section. Thus, a first component, region, or section referred to in examples described herein may also be referred to as a second component, region, or section without departing from the teachings of the examples. However, in the present specification, a first lens refers to a lens closest to an object, while an eighth lens refers to a lens closest to an image sensor. In addition, a first surface of each lens refers to a surface of the lens closest to an object side (or an object-side surface) and a second surface of each lens refers to a surface of the lens closest to an image side (or an image-side surface).

In accordance with illustrative examples, the embodiments described of the optical system include eight lenses with a refractive power. However, the number of lenses in the optical system may vary in some embodiments, for example, between two to eight lenses, while achieving one or more results and benefits described below. Also, although each lens is described with a particular refractive power, a different refractive power for at least one of the lenses may be used to achieve the intended result.

Further, all numerical values of radii of curvature and thicknesses of lenses, and the like, are denoted in millimeters (mm), and a field of view (FOV) of an optical imaging system is indicated by degrees. A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Likewise, thicknesses of lenses, gaps between the lenses, OALs, TLs, SLs are distances measured based on an optical axis of the lenses.

Further, in a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex. Meanwhile, a paraxial region refers to a very narrow region in the vicinity of an optical axis. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

An optical imaging system according to embodiments in the present disclosure may include eight lenses. For example, the optical imaging system according to the embodiments may include a first lens, a second lens, a third lens, a fourth lens, a fifth lens, a sixth lens, a seventh lens, and an eighth lens sequentially disposed from the object side to an imaging plane. However, the optical imaging system according to the embodiments is not limited to only including lenses, but may further include additional components. For example, the optical imaging system may further include an image sensor converting an image of a subject incident on the image sensor into an electrical signal.

In addition, the optical imaging system may further include an infrared cut-off filter filtering infrared light. The infrared cut-off filter may be disposed between the eighth lens and the image sensor. In addition, the optical imaging system may further include a stop controlling an amount of light. As examples, the stop may be disposed between the third lens and the fourth lens or between the fourth lens and the fifth lens.

In the optical imaging system according to the embodiments, the first to eighth lenses may be formed of plastic. In addition, at least one of the first to eighth lenses may have an aspherical surface. Further, each of the first to eighth lenses may have at least one aspherical surface. That is, at least one of first and second surfaces of all of the first to eighth lenses may be aspherical. The aspherical surfaces of the first to eighth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad [\text{Equation 1}]$$

Here, c represents a curvature (an inverse of a radius of curvature) of a lens, K represents a conic constant, and Y represents a distance from a certain point on an aspherical surface of the lens to an optical axis in a direction perpendicular to the optical axis. In addition, constants A to F represent aspherical coefficients. Further in Equation 1, Z represents a distance between the certain point on the aspherical surface of the lens at the distance Y and a tangential plane meeting the apex of the aspherical surface of the lens.

The optical imaging system including the first to eighth lenses may respectively have a positive refractive power, a negative refractive power, a positive refractive power, a positive refractive power, a negative refractive power, a positive refractive power, a negative refractive power, and a positive refractive power, sequentially from the object side to the imaging plane.

The optical imaging system according to embodiments may satisfy the following Conditional Expressions:

$BFL/f < 0.15$     [Conditional Expression 1]

$0.7 < TTL/f < 1.0$     [Conditional Expression 2]

$f/ImgH < 2.9$     [Conditional Expression 3]

$-30 < f6/f < 30$     [Conditional Expression 4]

$TTL/ImgH > 1.0$.     [Conditional Expression 5]

Here, f represents an overall focal length of the optical imaging system, BFL represents a distance from an image-side surface of the eighth lens to an imaging plane of the image sensor, TTL represents a distance from an object-side surface of the first lens to the imaging plane of the image sensor, ImgH represents a half of a diagonal length of the imaging plane of the image sensor, and f6 represents a focal length of the sixth lens.

TABLE 1

| | First Exemplary Embodiment | Second Exemplary Embodiment | Third Exemplary Embodiment | Fourth Exemplary Embodiment | Fifth Exemplary Embodiment | Sixth Exemplary Embodiment |
|---|---|---|---|---|---|---|
| TTL/f | 0.893 | 0.853 | 0.842 | 0.832 | 0.944 | 0.833 |
| BFL/f | 0.130 | 0.095 | 0.095 | 0.095 | 0.149 | 0.100 |
| f/ImgH | 2.835 | 2.835 | 2.835 | 2.835 | 2.686 | 2.686 |
| f6/f | 11.256 | −5.640 | −4.747 | −1.569 | 9.601 | −27.026 |
| TTL/ImgH | 1.265 | 1.209 | 1.194 | 1.179 | 1.268 | 1.119 |

Next, the first to eighth lenses constituting the optical imaging system according to the examples will be described. The first lens may have a positive refractive power. In addition, the first lens may have a meniscus shape of which an object-side surface is convex. In an embodiment, a first surface of the first lens is convex in the paraxial region and a second surface is concave in the paraxial region. Alternatively, in other embodiments both surfaces of the first lens may be convex. At least one of the first and second surfaces of the first lens may be aspherical. For example, both surfaces of the first lens are aspherical.

The second lens may have a negative refractive power. In addition, the second lens may have a meniscus shape of which an object-side surface is convex. In an embodiment, a first surface of the second lens is convex in the paraxial region and a second surface is concave in the paraxial region. At least one of the first and second surfaces of the second lens may be aspherical. For example, both surfaces of the second lens are aspherical.

The third lens may have a positive or negative refractive power. In addition, the third lens may have a meniscus shape of which an object-side surface is convex. In an embodiment, a first surface of the third lens is convex in the paraxial region and a second surface is concave in the paraxial region. At least one of the first and second surfaces of the third lens may be aspherical. For example, both surfaces of the third lens are aspherical.

The fourth lens may have a positive refractive power. In addition, the fourth lens may have a meniscus shape of which an object-side surface is convex. In an embodiment, a first surface of the fourth lens is convex in the paraxial region and a second surface is concave in the paraxial region. At least one of the first and second surfaces of the fourth lens may be aspherical. For example, both surfaces of the fourth lens are aspherical.

The fifth lens may have a negative refractive power. In addition, both surfaces of the fifth lens may be concave. In an embodiment, first and second surfaces of the fifth lens are concave. Alternatively, the fifth lens may have a meniscus shape of which an object-side surface is convex. In an alternative embodiment, a first surface of the fifth lens may be convex in the paraxial region and a second surface is concave in the paraxial region. At least one of the first and second surfaces of the fifth lens may be aspherical. For example, both surfaces of the fifth lens are aspherical.

The sixth lens may have a positive or negative refractive power. In addition, the sixth lens may have a meniscus shape of which an image-side surface is convex. In an embodiment, a first surface of the sixth lens is concave in the paraxial region and a second surface is convex in the paraxial region. Alternatively, both surfaces of the sixth lens may be concave. In an alternative embodiment, the first and second surfaces of the sixth lens may be concave. At least one of the first and second surfaces of the sixth lens may be aspherical. For example, both surfaces of the sixth lens are aspherical.

The seventh lens may have a negative refractive power. In addition, both surfaces of the seventh lens may be concave. In an embodiment, first and second surfaces of the seventh lens are concave in the paraxial region. At least one of the first and second surfaces of the seventh lens may be aspherical. For example, both surfaces of the seventh lens are aspherical.

In addition, at least one inflection point may be formed on one or both of the first and second surfaces of the seventh lens. For example, the first surface of the seventh lens is concave in the paraxial region and becomes convex toward an edge of the lens. In addition, the second surface of the seventh lens is concave in the paraxial region and becomes convex at an edge of the lens.

The eighth lens may have a positive refractive power. In addition, both surfaces of the eighth lens may be convex. In an embodiment, the first and second surfaces of the eighth lens are convex. Alternatively, the eighth lens may have a meniscus shape of which an object-side surface is convex. In an alternative embodiment, a first surface of the eighth lens may be convex in the paraxial region, and a second surface may be concave in the paraxial region.

At least one of the first and second surfaces of the eighth lens may be aspherical. For example, both surfaces of the eighth lens are aspherical. In addition, at least one inflection point may be formed on the second surface of the eighth lens. For example, the second surface of the eighth lens is concave in the paraxial region and becomes convex toward an edge of the lens.

In the optical imaging system configured as described above, a plurality of lenses may perform an aberration correction function to increase aberration correction. In addition, in the optical imaging systems according to the embodiments, a constant (F-number) indicating brightness of the optical imaging system is 2.4 or less. Therefore, the optical imaging systems may clearly capture an image even in an environment in which illumination is low. In addition, the optical imaging systems according to the embodiments may have a telephoto ratio (TTL/f) smaller than 1 to have features of a telephoto lens and have a field of view (FOV) of 40° or less. Therefore, a narrow FOV is implemented.

Figure 2:
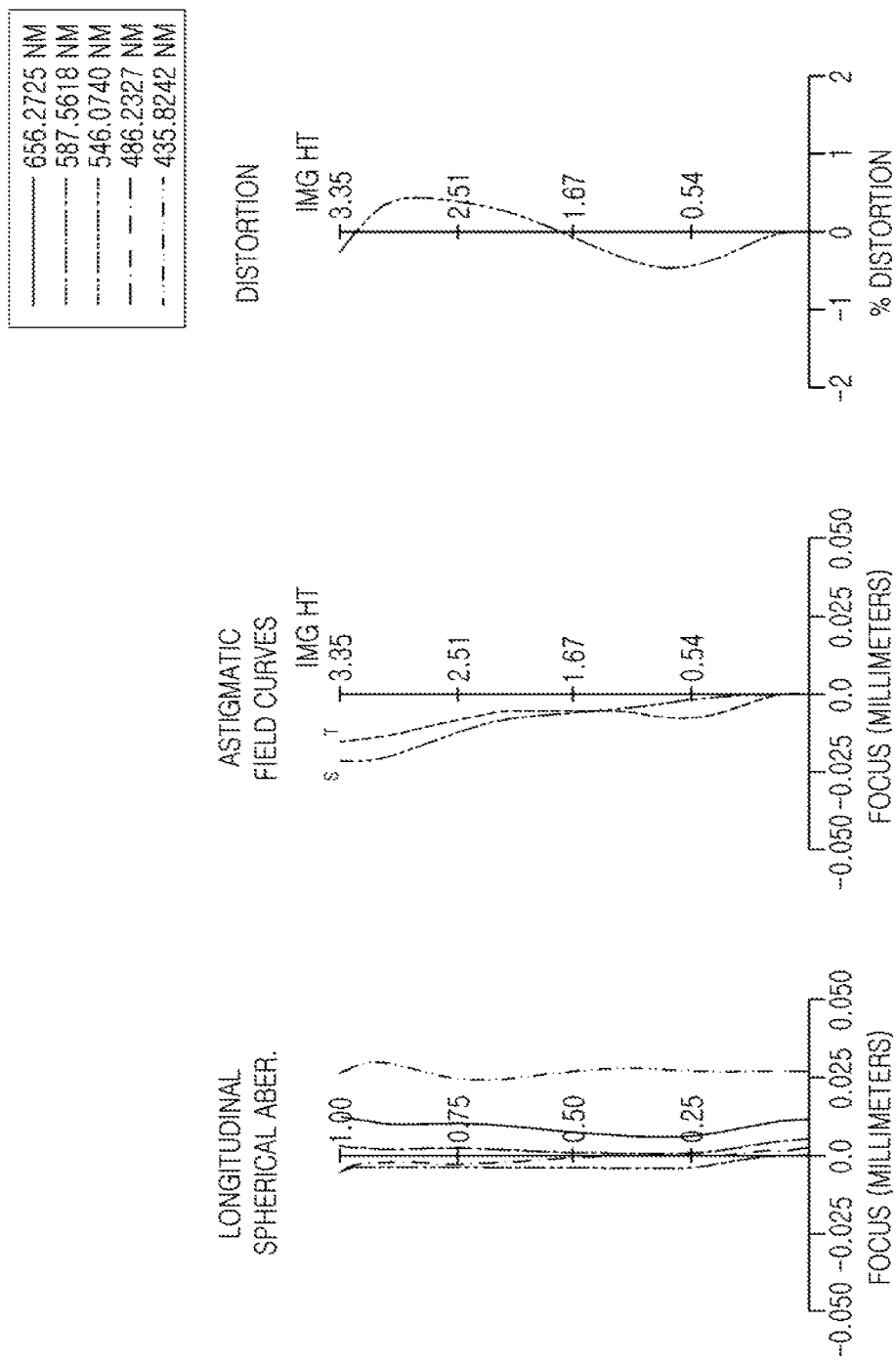
FIG. 2 is a set of graphs having curves representing aberration characteristics of the optical imaging system illustrated in FIG. 1.

An optical imaging system according to a first example in the present disclosure will be described with reference to FIGS. 1 through 4. The optical imaging system according to the first example includes a first lens 110, a second lens 120, a third lens 130, a fourth lens 140, a fifth lens 150, a sixth lens 160, a seventh lens 170, and an eighth lens 180. The optical imaging system according to the first example may further include a stop ST, an infrared cut-off filter 190, and an image sensor 191.

Respective characteristics (radii of curvature, thicknesses or distances between lenses, refractive indices, and Abbe numbers) of lenses are listed in FIG. 3. Meanwhile, by way of example, a focal length (f1) of the first lens is 4.622 mm, a focal length (f2) of the second lens is −7.990 mm, a focal length (f3) of the third lens is 22.288 mm, a focal length (f4) of the fourth lens is 38.607 mm, a focal length (f5) of the fifth lens is −11.193 mm, a focal length (f6) of the sixth lens is 106.931 mm, a focal length (f7) of the seventh lens is −7.066 mm, and a focal length (f8) of the eighth lens is 18.325 mm. In addition, for the optical imaging system according to the first example, BFL/f is 0.13, TTL/f is 0.893, f/ImgH is 2.835, f6/f is 11.256, and TTL/ImgH is 1.265.

In the first example, the first lens 110 has a positive refractive power, a convex first surface in the paraxial region and a concave second surface in the paraxial region. The second lens 120 has a negative refractive power, a convex first surface in the paraxial region, and a concave second surface in the paraxial region. The third lens 130 has a positive refractive power, a convex first surface in the paraxial region, and a concave second surface in the paraxial region. The fourth lens 140 has a positive refractive power, a convex first surface in the paraxial region, and a concave second surface in the paraxial region.

The fifth lens 150 has a negative refractive power and concave first and second surfaces in the paraxial region. The sixth lens 160 has a positive refractive power, a concave first surface in the paraxial region, and a convex second surface in the paraxial region. The seventh lens 170 has a negative refractive power and concave first and second surfaces in the paraxial region. In addition, at least one inflection point may be formed on one or both of the first and second surfaces of seventh lens 170. For example, the first surface of seventh lens 170 is concave in a paraxial region and becomes convex toward an edge of lens 170. In addition, the second surface of seventh lens 170 is concave in the paraxial region and becomes convex at an edge of lens 170. The eighth lens 180 has a positive refractive power, and a convex first surface and a convex second surface in the paraxial region.

Respective surfaces of first to eighth lenses 110 to 180 have aspherical coefficients as listed in FIG. 4. For example, all of object-side surfaces and image-side surfaces of first to eighth lenses 110 to 180 are aspherical. Optionally, stop ST is disposed between third lens 130 and fourth lens 140. The optical imaging system configured as described above has aberration characteristics as illustrated by the graphs in FIG. 2.

Figure 5:
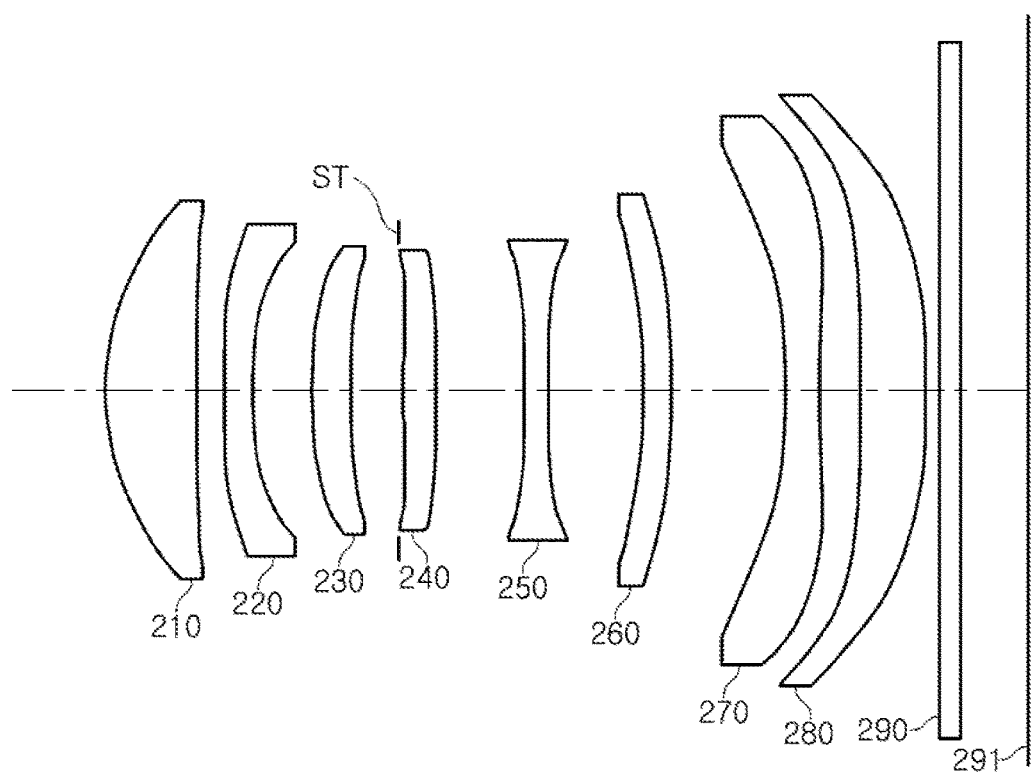
FIG. 5 is a view illustrating an optical imaging system according to a second example.
Figure 6:
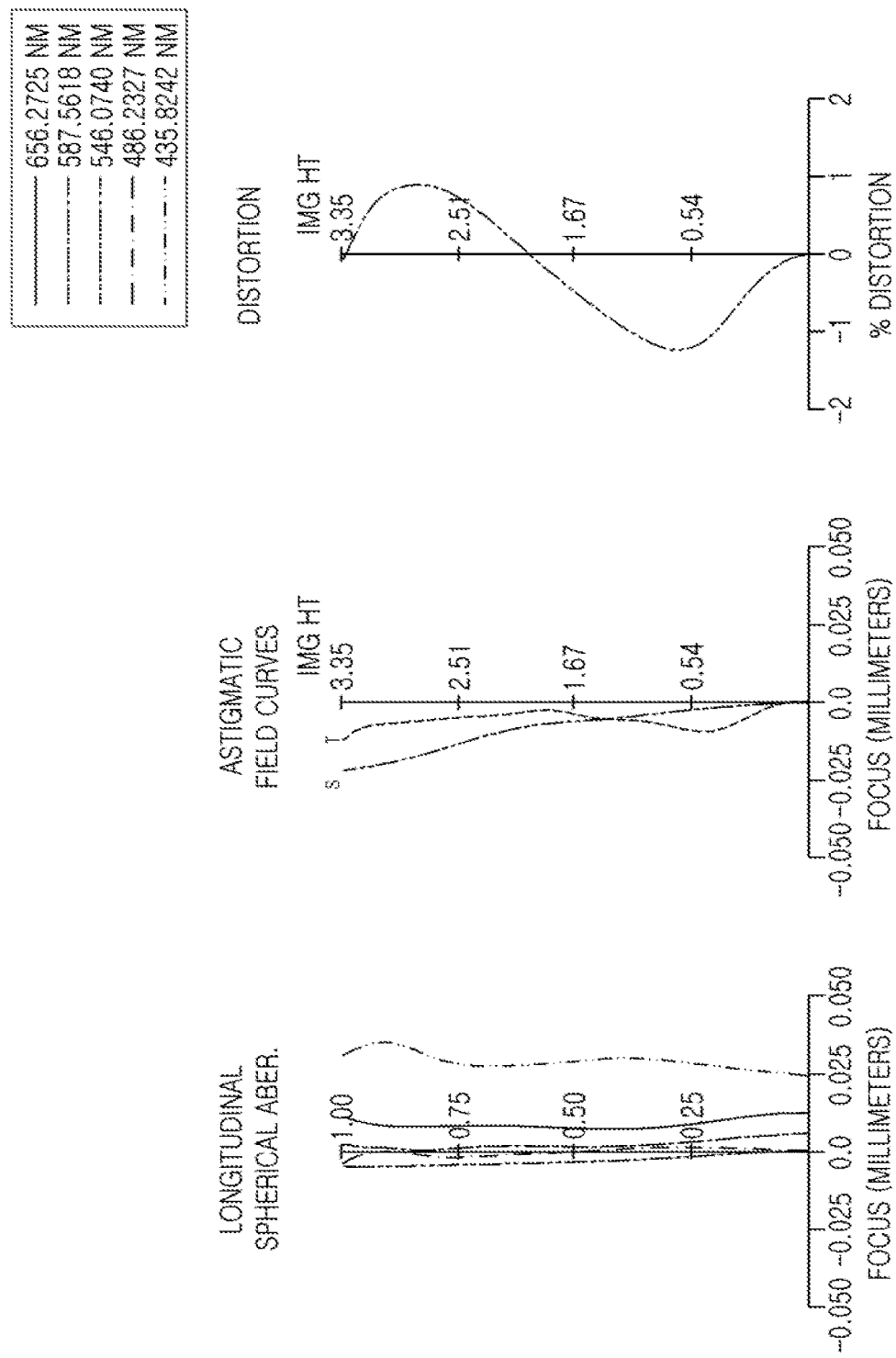
FIG. 6 is a set of graphs having curves representing aberration characteristics of the optical imaging system illustrated in FIG. 5.

An optical imaging system according to a second example in the present disclosure will be described with reference to FIGS. 5 through 8. The optical imaging system according to the second example includes a first lens 210, a second lens 220, a third lens 230, a fourth lens 240, a fifth lens 250, a sixth lens 260, a seventh lens 270, and an eighth lens 280. The optical imaging system according to the second example may further include a stop ST, an infrared cut-off filter 290, and an image sensor 291.

Respective characteristics (radii of curvature, thicknesses or distances between lenses, refractive indices, and Abbe numbers) of lenses are listed in FIG. 7. Meanwhile, by way of example, a focal length (f1) of the first lens is 4.6171 mm, a focal length (f2) of the second lens is −7.8634 mm, a focal length (f3) of the third lens is 21.3041 mm, a focal length (f4) of the fourth lens is 31.1721 mm, a focal length (f5) of the fifth lens is −10.1467 mm, a focal length (f6) of the sixth lens is −53.5815 mm, a focal length (f7) of the seventh lens s −7.0016 mm, and a focal length (f8) of the eighth lens is 18.1526 mm. In addition, for the optical imaging system according to the second example, BFL/f is 0.095, TTL/f is 0.853, f/ImgH is 2.835, f6/f is −5.64, and TTL/ImgH is 1.209.

In the second example, first lens 210 has a positive refractive power, a convex first surface in the paraxial region, and a concave second surface in the paraxial region. The second lens 220 has a negative refractive power, a convex first surface in the paraxial region, and a concave second surface in the paraxial region. The third lens 230 has a positive refractive power, a convex first surface in the paraxial region, and a concave second surface in the paraxial region. The fourth lens 240 has a positive refractive power, a convex first surface in the paraxial region, and a concave second surface in the paraxial region.

The fifth lens 250 has a negative refractive power and concave first surface and second surfaces in the paraxial region. The sixth lens 260 has a negative refractive power, a concave first surface in the paraxial region, and a convex second surface in the paraxial region. The seventh lens 270 has a negative refractive power and concave first and second surfaces in the paraxial region. In addition, at least one inflection point may be formed on one or both of the first and second surfaces of seventh lens 270. For example, the first surface of seventh lens 270 is concave in a paraxial region and becomes convex toward an edge of lens 270. In addition, the second surface of seventh lens 270 is concave in the paraxial region and becomes convex at an edge of lens 270. The eighth lens 280 has a positive refractive power and convex first and second surfaces in the paraxial region.

Meanwhile, respective surfaces of first to eighth lenses 210 to 280 have aspherical coefficients as listed in FIG. 8. For example, all of object-side surfaces and image-side surfaces of first to eighth lenses 210 to 280 are aspherical. Optionally, stop ST is disposed between third lens 230 and fourth lens 240. The optical imaging system configured as described above has aberration characteristics as illustrated by the graphs in FIG. 6.

Figure 9:
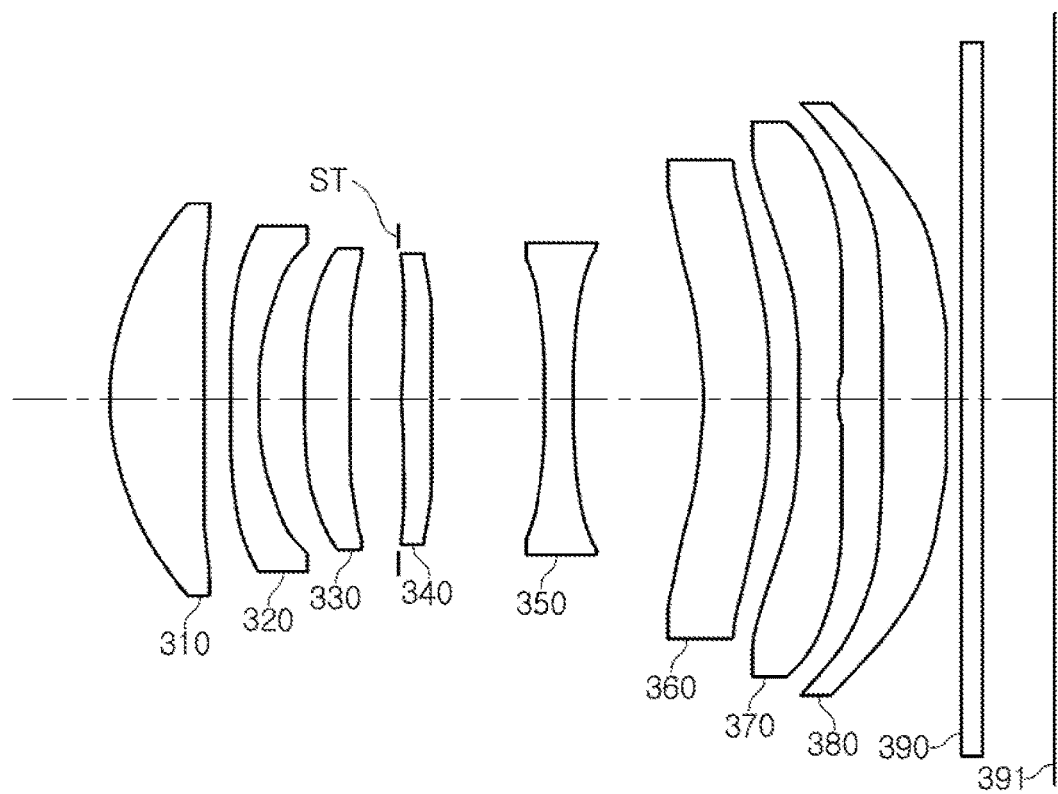
FIG. 9 is a view illustrating an optical imaging system according to a third example.
Figure 10:
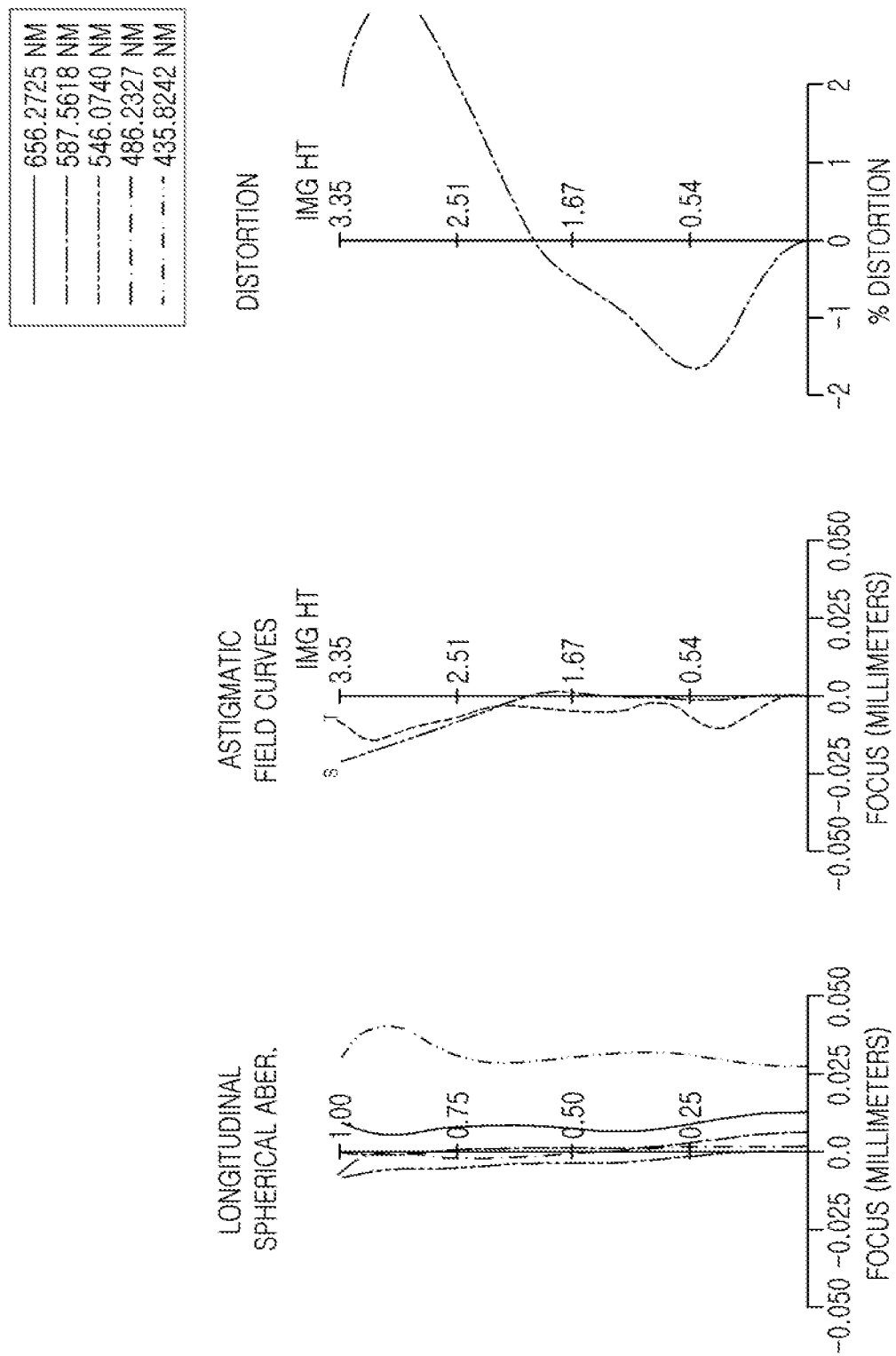
FIG. 10 is a set of graphs having curves representing aberration characteristics of the optical imaging system illustrated in FIG. 9.

An optical imaging system according to a third example in the present disclosure will be described with reference to FIGS. 9 through 12. The optical imaging system according to the third example includes a first lens 310, a second lens 320, a third lens 330, a fourth lens 340, a fifth lens 350, a sixth lens 360, a seventh lens 370, and an eighth lens 380. The optical imaging system according to the third example may further include a stop ST, an infrared cut-off filter 390, and an image sensor 391.

Respective characteristics (radii of curvature, thicknesses or distances between lenses, refractive indices, and Abbe numbers) of lenses are listed in FIG. 11. Meanwhile, by way of example, a focal length (f1) of the first lens is 4.5688 mm, a focal length (f2) of the second lens is −7.667 mm, a focal length (f3) of the third lens is 15.6031 mm, a focal length (f4) of the fourth lens is 35.7796 mm, a focal length (f5) of the fifth lens is −7.4186 mm, a focal length (f6) of the sixth lens is −45.0951 mm, a focal length (f7) of the seventh lens is −8.6419 mm, and a focal length (f8) of the eighth lens is 25.7824 mm. In addition, for the optical imaging system according to the third example, BFL/f is 0.095, TTL/f is 0.842, f/ImgH is 2.835, f6/f is −4.747, and TTL/ImgH is 1.194.

In the third example, the first lens 310 has a positive refractive power, a convex first surface in the paraxial region, and a concave second surface in the paraxial region. The second lens 320 has a negative refractive power, a convex first surface in the paraxial region, and a concave second surface in the paraxial region. The third lens 330 has a positive refractive power, a convex first surface in the paraxial region, and a concave second surface in the paraxial region. The fourth lens 340 has a positive refractive power, a convex first surface in the paraxial region, and a concave second surface in the paraxial region.

The fifth lens 350 has a negative refractive power and concave first and second surfaces in the paraxial region. The sixth lens 360 has a negative refractive power, a concave first surface in the paraxial region, and a convex second surface in the paraxial region. The seventh lens 370 has a negative refractive power and concave first and second surfaces in the paraxial region. In addition, at least one inflection point may be formed on one or both of the first and second surfaces of the seventh lens 370. For example, the first surface of seventh lens 370 is concave in a paraxial region and becomes convex toward an edge of lens 370. In addition, the second surface of seventh lens 370 is concave in the paraxial region and becomes convex at an edge of lens 370. The eighth lens 380 has a positive refractive power and convex first and second surfaces in the paraxial region.

Respective surfaces of first to eighth lenses 310 to 380 have aspherical coefficients as listed in FIG. 12. For example, all of object-side surfaces and image-side surfaces of first to eighth lenses 310 to 380 are aspherical. Optionally, stop ST is disposed between third lens 330 and fourth lens 340. In addition, the optical imaging system configured as described above has aberration characteristics as illustrated by the graphs in FIG. 10.

Figure 13:
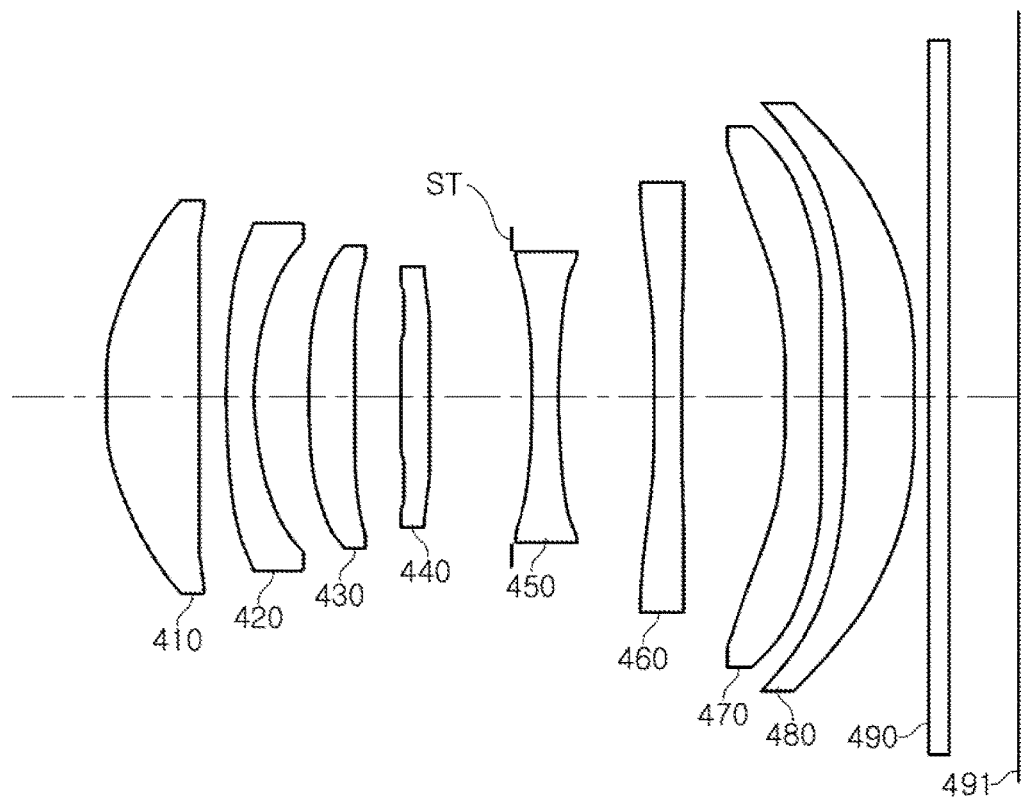
FIG. 13 is a view illustrating an optical imaging system according to a fourth example.
Figure 14:
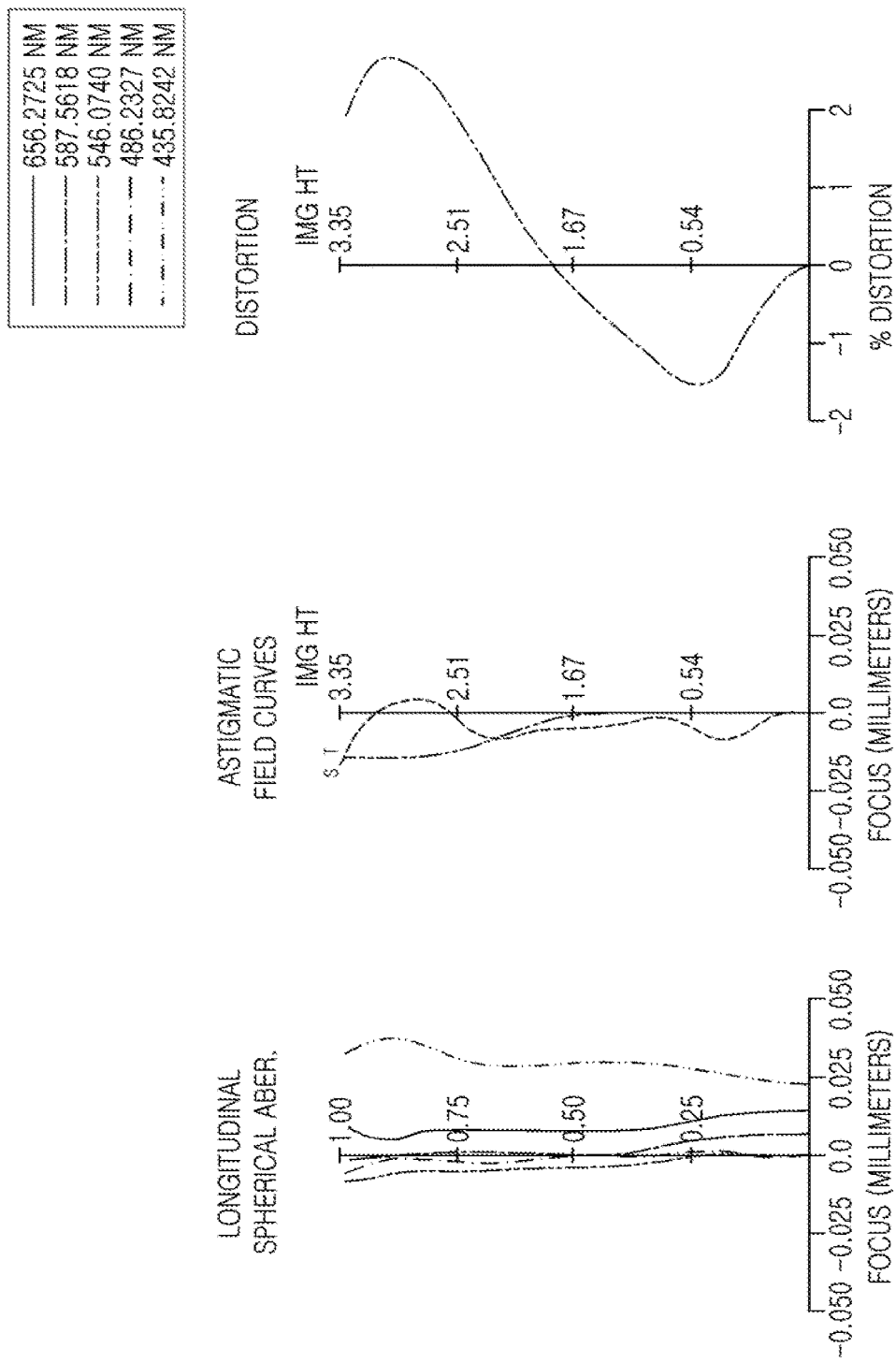
FIG. 14 is a set of graphs having curves representing aberration characteristics of the optical imaging system illustrated in FIG. 13.

An optical imaging system according to a fourth example in the present disclosure will be described with reference to FIGS. 13 through 16. The optical imaging system according to the fourth example includes a first lens 410, a second lens 420, a third lens 430, a fourth lens 440, a fifth lens 450, a sixth lens 460, a seventh lens 470, and an eighth lens 480. The optical imaging system according to the fourth example may further include a stop ST, an infrared cut-off filter 490, and an image sensor 491.

Respective characteristics (radii of curvature, thicknesses or distances between lenses, refractive indices, and Abbe numbers) of lenses are listed in FIG. 15. Meanwhile, by way of example, a focal length (f1) of the first lens is 4.5911 mm, a focal length (f2) of the second lens is −7.433 mm, a focal length (f3) of the third lens is 15.5555 mm, a focal length (f4) of the fourth lens is 27.9197 mm, a focal length (f5) of the fifth lens is −8.634 mm, a focal length (f6) of the sixth lens is −14.9025 mm, a focal length (f7) of the seventh lens is −7.3676 mm, and a focal length (f8) of the eighth lens is 12.3205 mm. In addition, for the optical imaging system according to the fourth example, BFL/f is 0.095, TTL/f is 0.832, f/ImgH is 2.835, f6/f is −1.569, and TTL/ImgH is 1.179.

In the fourth example, the first lens 410 has a positive refractive power, a convex first surface in the paraxial region, and a concave second surface in the paraxial region. The second lens 420 has a negative refractive power, a convex first surface in the paraxial region, and a concave second surface in the paraxial region. The third lens 430 has a positive refractive power, a convex first surface in the paraxial region, and a concave second surface in the paraxial region. The fourth lens 440 has a positive refractive power, a convex first surface in the paraxial region, and a concave second surface in the paraxial region.

The fifth lens 450 has a negative refractive power and concave first and second surfaces in the paraxial region. The sixth lens 460 has a negative refractive power and concave first surface and second surfaces in the paraxial region. The seventh lens 470 has a negative refractive power and concave first and second surfaces in the paraxial region. In addition, at least one inflection point may be formed on one or both of the first and second surfaces of seventh lens 470. For example, the first surface of seventh lens 470 is concave in a paraxial region and becomes convex toward an edge of lens 470. In addition, the second surface of seventh lens 470 is concave in the paraxial region and becomes convex at an edge of lens 470. The eighth lens 480 has a positive refractive power and convex first and second surfaces in the paraxial region.

Respective surfaces of first to eighth lenses 410 to 480 have aspherical coefficients as listed in FIG. 16. For example, all of object-side surfaces and image-side surfaces of first to eighth lenses 410 to 480 are aspherical. Optionally, stop ST is disposed between fourth lens 440 and fifth lens 450. In addition, the optical imaging system configured as described above has aberration characteristics as illustrated by the graphs in FIG. 14.

Figure 17:
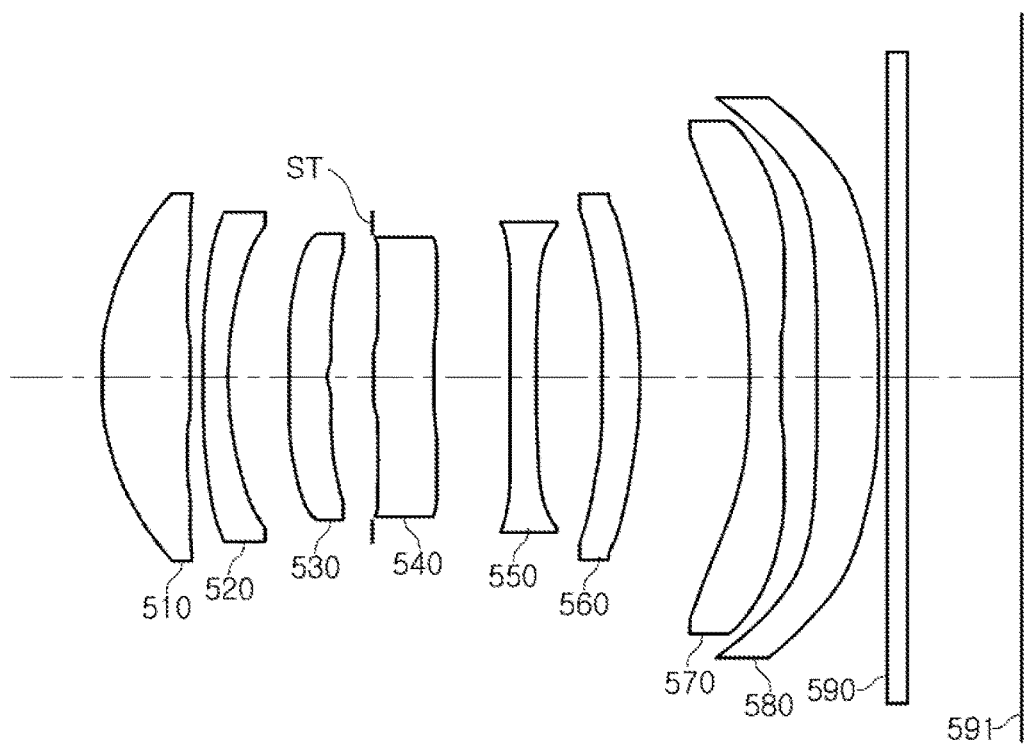
FIG. 17 is a view illustrating an optical imaging system according to a fifth example.
Figure 18:
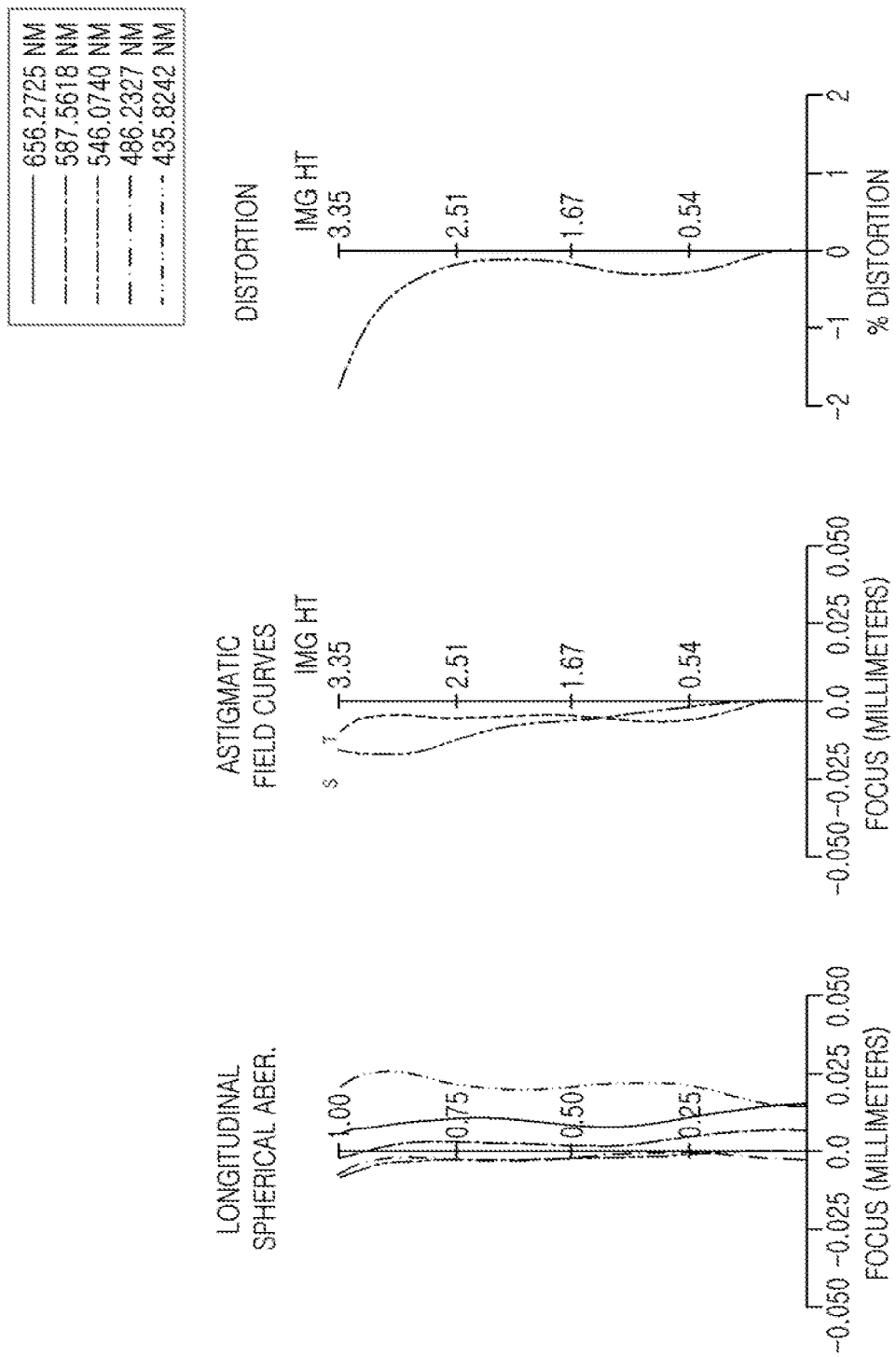
FIG. 18 is a set of graphs having curves representing aberration characteristics of the optical imaging system illustrated in FIG. 17.

An optical imaging system according to a fifth example in the present disclosure will be described with reference to FIGS. 17 through 20. The optical imaging system according to the fifth example includes a first lens 510, a second lens 520, a third lens 530, a fourth lens 540, a fifth lens 550, a sixth lens 560, a seventh lens 570, and an eighth lens 580. The optical imaging system according to the fifth example may further include a stop ST, an infrared cut-off filter 590, and an image sensor 591.

Respective characteristics (radii of curvature, thicknesses or distances between lenses, refractive indices, and Abbe numbers) of lenses are listed in FIG. 19. Meanwhile, by way of example, a focal length (f1) of the first lens is 4.5945 mm, a focal length (f2) of the second lens is −10.0201 mm, a focal length (f3) of the third lens is −615.7002 mm, a focal length (f4) of the fourth lens is 1017.38 mm, a focal length (f5) of the fifth lens is −24.508 mm, a focal length (f6) of the sixth lens is 86.4093 mm, a focal length (f7) of the seventh lens is −6.5688 mm, and a focal length (f8) of the eighth lens is 15.8206 mm. In addition, for the optical imaging system according to the fifth example, BFL/f is 0.149, TTU/f is 0.944, f/ImgH is 2.686, f6/f is 9.601, and TTL/ImgH is 1.268.

In the fifth example, the first lens 510 has a positive refractive power and convex first and second surfaces in the paraxial region. The second lens 520 has a negative refractive power, a convex first surface in the paraxial region, and a concave second surface in the paraxial region. The third lens 530 has a negative refractive power, a convex first surface in the paraxial region, and a concave second surface in the paraxial region. The fourth lens 540 has a positive refractive power, a convex first surface in the paraxial region, and a concave second surface in the paraxial region.

The fifth lens 550 has a negative refractive power, a convex first surface in the paraxial region, and a concave second surface in the paraxial region. The sixth lens 560 has a positive refractive power, a concave first surface in the paraxial region, and a convex second surface in the paraxial region. The seventh lens 570 has a negative refractive power and concave first and second surfaces in the paraxial region. In addition, at least one inflection point may be formed on one or both of the first and second surfaces of seventh lens 570. For example, the first surface of seventh lens 570 is concave in a paraxial region and becomes convex toward an edge of lens 570. In addition, the second surface of seventh lens 570 is concave in the paraxial region and becomes convex at an edge of lens 570. The eighth lens 580 has a positive refractive power and convex first and second surfaces in the paraxial region.

Respective surfaces of first to eighth lenses 510 to 580 have aspherical coefficients as listed in FIG. 20. For example, all of object-side surfaces and image-side surfaces of first to eighth lenses 510 to 580 are aspherical. Optionally, stop ST is disposed between third lens 530 and fourth lens 540. In addition, the optical imaging system configured as described above has aberration characteristics as illustrated by the graphs in FIG. 18.

Figure 21:
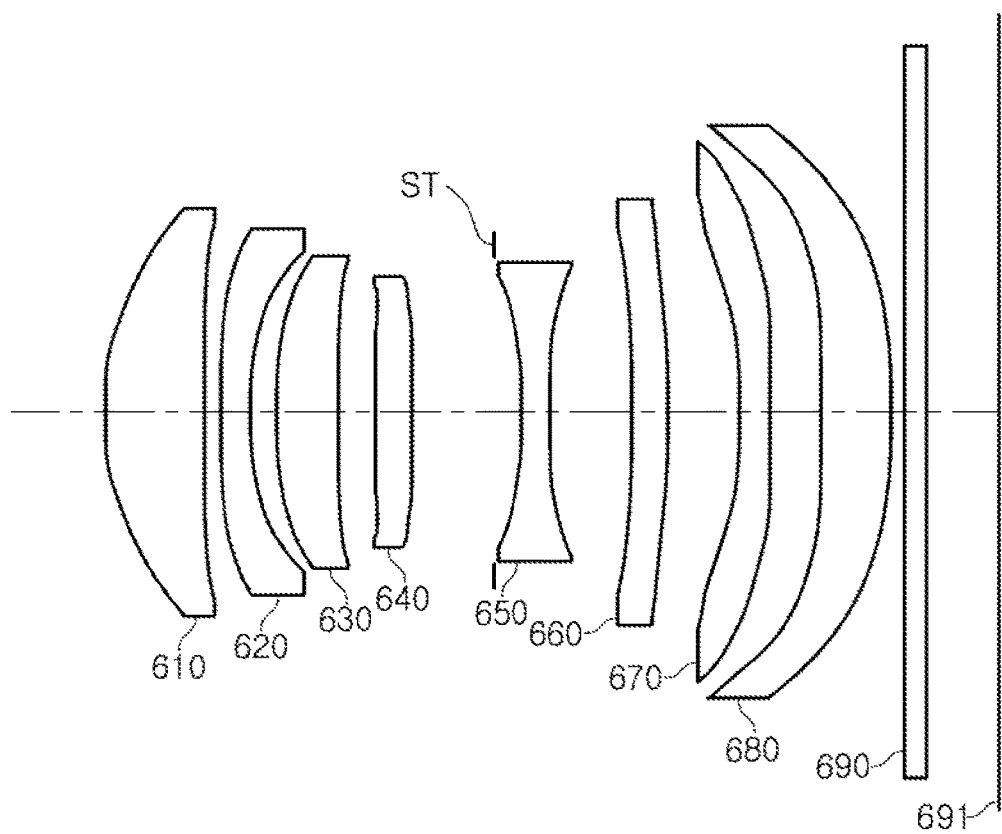
FIG. 21 is a view illustrating an optical imaging system according to a sixth example.
Figure 22:
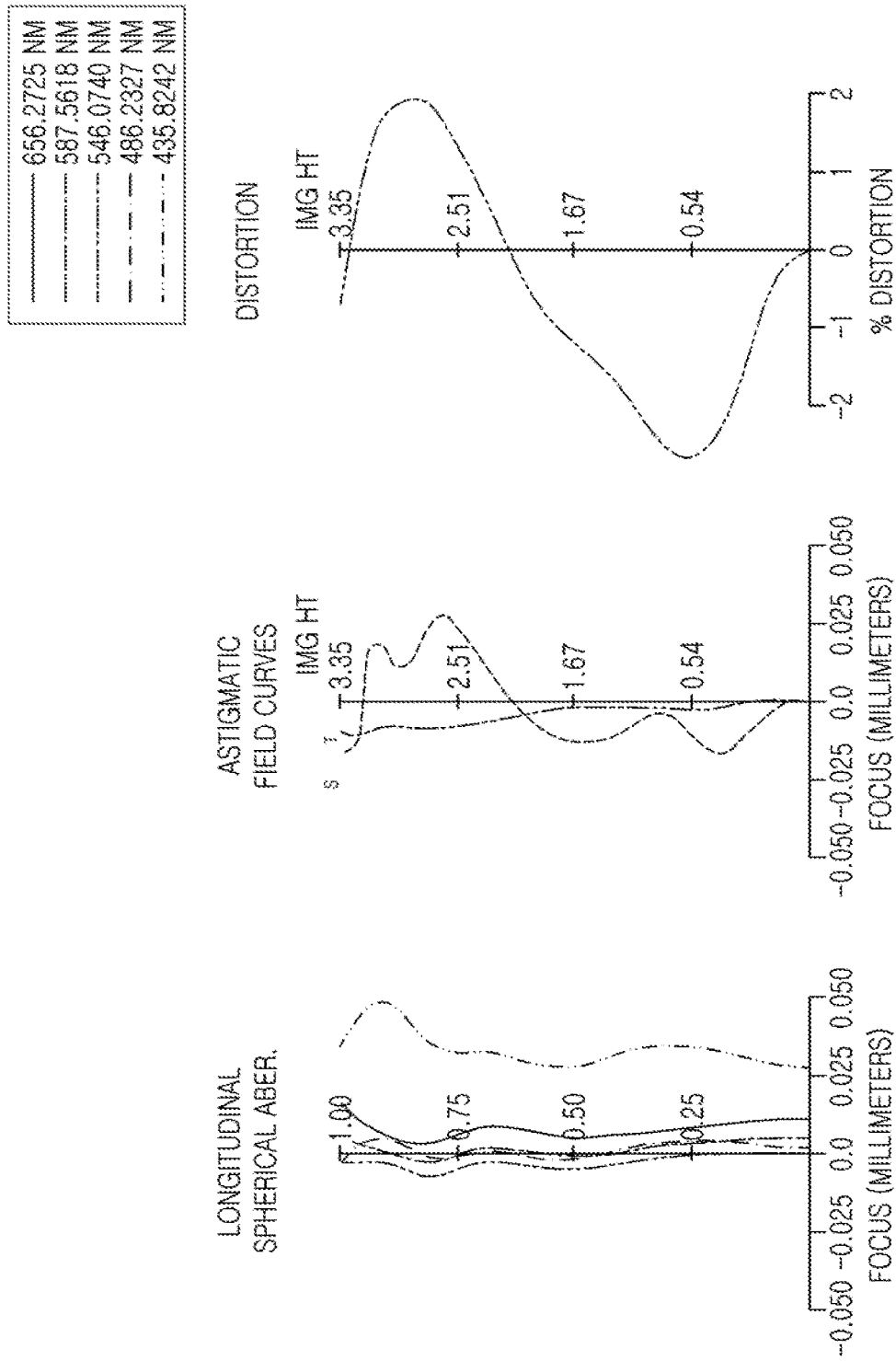
FIG. 22 is a set of graphs having curves representing aberration characteristics of the optical imaging system illustrated in FIG. 21.

An optical imaging system according to a sixth example in the present disclosure will be described with reference to FIGS. 21 through 24. The optical imaging system according to the sixth example includes a first lens 610, a second lens 620, a third lens 630, a fourth lens 640, a fifth lens 650, a sixth lens 660, a seventh lens 670, and an eighth lens 680. The optical imaging system according to the sixth example may further include a stop ST, an infrared cut-off filter 690, and an image sensor 691.

Respective characteristics (radii of curvature, thicknesses or distances between lenses, refractive indices, and Abbe numbers) of lenses are listed in FIG. 23. Meanwhile, by way of example, a focal length (f1) of the first lens is 4.4844 mm, a focal length (f2) of the second lens is −7.3212 mm, a focal length (f3) of the third lens is 12.1061 mm, a focal length (f4) of the fourth lens is 29.3566 mm, a focal length (f5) of the fifth lens is −5.8446 mm, a focal length (f6) of the sixth lens is −243.2353 mm, a focal length (f7) of the seventh lens is −8.4043 mm, and a focal length (f8) of the eighth lens is 120.4209 mm. In addition, for the optical imaging system according to the sixth example, BFL/f is 0.1, TTL/f is 0.833, f/ImgH is 2.686, f6/f is −27.026, and TTL/ImgH is 1.119.

In the sixth embodiment, the first lens 610 has a positive refractive power, a convex first surface in the paraxial region, and a concave second surface in the paraxial region. The second lens 620 has a negative refractive power, a convex first surface in the paraxial region, and a concave second surface in the paraxial region. The third lens 630 has a positive refractive power, a convex first surface in the paraxial region, and a concave second surface in the paraxial region. The fourth lens 640 has a positive refractive power, a convex first surface in the paraxial region, and a concave second surface in the paraxial region.

The fifth lens 650 has a negative refractive power and concave first and second surfaces in the paraxial region. The sixth lens 660 has a negative refractive power, a concave first surface in the paraxial region, and a convex second surface in the paraxial region. The seventh lens 670 has a negative refractive power and concave first and second surfaces in the paraxial region. In addition, at least one inflection point may be formed on one or both of the first and second surfaces of seventh lens 670. For example, the first surface of seventh lens 670 is concave in a paraxial region and becomes convex toward an edge of lens 670. In addition, the second surface of seventh lens 670 is concave in the paraxial region and becomes convex at an edge of lens 670. The eighth lens 680 has a positive refractive power, a convex first surface in the paraxial region, and a concave second surface in the paraxial region. In addition, at least one inflection point may be formed on the second surface of eighth lens 680. For example, the second surface of eighth lens 680 is concave in the paraxial region and becomes convex toward an edge of lens 680.

Respective surfaces of first to eighth lenses 610 to 680 have aspherical coefficients as listed in FIG. 24. For example, all of object-side surfaces and image-side surfaces of first to eighth lenses 610 to 680 are aspherical. Optionally, stop ST is disposed between fourth lens 640 and fifth lens 650. In addition, the optical imaging system configured as described above has aberration characteristics as illustrated by the graphs in FIG. 22.

As set forth above, according to embodiments in the present disclosure, an optical imaging system having a narrow field of view while maintaining a thin width may be implemented. In addition, an improved aberration correction effect may be realized, and a high level of resolution may be implemented. While embodiments have been shown and described above, it will be apparent to those after an understanding of the disclosure that modifications and variations could be made without departing from the scope of the present application as defined by the appended claims.

What is claimed is:

1. An optical imaging system comprising:
a first lens comprising a positive refractive power, a second lens comprising a negative refractive power, a third lens comprising a refractive power, a fourth lens comprising a positive refractive power, a fifth lens comprising a negative refractive power, a sixth lens comprising a refractive power, a seventh lens comprising a refractive power, and an eighth lens comprising a refractive power, sequentially disposed from an object side to an imaging plane,
wherein BFL/f<0.15, where BFL represents a distance from an image-side surface of the eighth lens to an imaging plane of an image sensor and f represents an overall focal length of an optical system including the first to eighth lenses.

2. The optical imaging system of claim 1, wherein 0.7<TTL/f<1.0, where TTL represents a distance from an object-side surface of the first lens to the imaging plane of the image sensor.

3. The optical imaging system of claim 1, wherein f/ImgH<2.9, where ImgH represents a half of a diagonal length of the imaging plane of the image sensor.

4. The optical imaging system of claim 1, wherein −30<f6/f<30, where f6 represents a focal length of the sixth lens.

5. The optical imaging system of claim 1, wherein TTL/ImgH>1.0, where TTL represents a distance from an object-side surface of the first lens to the imaging plane of the image sensor and ImgH represents a half of a diagonal length of the imaging plane of the image sensor.

6. The optical imaging system of claim 1, further comprising a stop disposed between the third lens and the fourth lens or between the fourth lens and the fifth lens.

7. The optical imaging system of claim 1, wherein object-side surfaces and image-side surfaces of the first to eighth lenses are aspherical.

8. The optical imaging system of claim 1, wherein the first lens comprises a convex object-side surface along an optical axis.

9. The optical imaging system of claim 1, wherein the second lens comprises a convex object-side surface along an optical axis and a concave image-side surface along the optical axis.

10. The optical imaging system of claim 1, wherein the third lens comprises a convex object-side surface along an optical axis and a concave image-side surface along the optical axis.

11. The optical imaging system of claim 1, wherein the fourth lens comprises a convex object-side surface along an optical axis and a concave image-side surface along the optical axis.

12. The optical imaging system of claim 1, wherein the fifth lens comprises a concave image-side surface along an optical axis.

13. The optical imaging system of claim 1, wherein the sixth lens comprises a concave object-side surface along an optical axis.

14. The optical imaging system of claim 1, wherein the seventh lens comprises a negative refractive power, a concave object-side surface along an optical axis, and a concave image-side surface along the optical axis.

15. The optical imaging system of claim 1, wherein the eighth lens comprises a positive refractive power and a convex object-side surface along an optical axis.

16. The optical imaging system of claim 1, wherein
the first lens, second lens, the third lens, the fourth lens, and the eighth lens each comprise a convex object-side surface,
the second lens, the third lens, the fourth lens, the fifth lens, and the seventh lens each comprise a concave image-side surface, and
the sixth lens and the seventh lens each comprise a concave object-side surface.

17. An optical imaging system comprising:
a first lens comprising a positive refractive power, a second lens comprising a negative refractive power, a third lens comprising a refractive power, a fourth lens comprising a positive refractive power, a fifth lens comprising a negative refractive power, a sixth lens comprising a refractive power, a seventh lens comprising a refractive power, and an eighth lens comprising a refractive power, sequentially disposed from an object side to an imaging plane, and wherein 0.7<TTL/f<1.0, where TTL represents a distance from an object-side surface of the first lens to an imaging plane of an image sensor and f represents an overall focal length of the optical imaging system.

18. The optical imaging system of claim 17, wherein
the first lens, second lens, the third lens, the fourth lens, and the eighth lens each comprise a convex object-side surface,
the second lens, the third lens, the fourth lens, the fifth lens, and the seventh lens each comprise a concave image-side surface, and
the sixth lens and the seventh lens each comprise a concave object-side surface.

19. An optical imaging system comprising:
a first lens having a positive refractive power;
a second lens comprising a negative refractive power, a third lens comprising a refractive power, a fourth lens comprising a positive refractive power, a fifth lens comprising a negative refractive power, a sixth lens comprising a refractive power, and a seventh lens comprising a refractive power;
an eighth lens having a refractive power and a convex object-side surface along an optical axis,
wherein the first to eighth lenses are sequentially disposed from an object side to an imaging plane,
wherein an F-number of the optical imaging system is 2.4 or less,
wherein a field of view (FOV) of the optical imaging system is 40° or less, and
wherein 0.7<TTL/f<1.0, where TTL represents a distance from an object-side surface of the first lens to an imaging plane of an image sensor and f represents an overall focal length of the optical imaging system.

20. The optical imaging system of claim 19, wherein
the first lens, second lens, the third lens, and the fourth lens each comprise a convex object-side surface,
the second lens, the third lens, the fourth lens, the fifth lens, and the seventh lens each comprise a concave image-side surface, and
the sixth lens and the seventh lens each comprise a concave object-side surface.

* * * * *